US012242207B2

(12) United States Patent
Aso

(10) Patent No.: US 12,242,207 B2
(45) Date of Patent: Mar. 4, 2025

(54) IMAGE FORMING APPARATUS, IMAGE FORMING METHOD, AND COMPUTER-READABLE NON-TRANSITORY RECORDING MEDIUM

(71) Applicant: Konica Minolta, Inc., Tokyo (JP)

(72) Inventor: Hiromu Aso, Tokyo (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 18/454,478

(22) Filed: Aug. 23, 2023

(65) Prior Publication Data

US 2024/0069460 A1 Feb. 29, 2024

(30) Foreign Application Priority Data

Aug. 26, 2022 (JP) ................................ 2022-134964

(51) Int. Cl.
*G03G 15/02* (2006.01)
*G03G 15/00* (2006.01)

(52) U.S. Cl.
CPC ..... *G03G 15/0266* (2013.01); *G03G 15/5045* (2013.01); *G03G 15/6502* (2013.01); *G03G 15/6517* (2013.01); *G03G 2215/047* (2013.01)

(58) Field of Classification Search
CPC ........... G03G 15/0266; G03G 15/5045; G03G 15/6502; G03G 15/6517; G03G 2215/047; G03G 15/1675; G03G 15/1645
See application file for complete search history.

(56) References Cited

U.S. PATENT DOCUMENTS

| | | | | |
|---|---|---|---|---|
| 5,678,129 A * | 10/1997 | Yasuda | .............. | G03G 15/0266 399/176 |
| 2015/0338791 A1* | 11/2015 | Matsushita | ........ | G03G 15/1615 399/66 |
| 2018/0067423 A1* | 3/2018 | Oura | ................. | G03G 15/1675 |

FOREIGN PATENT DOCUMENTS

| | | |
|---|---|---|
| JP | 2011-053435 A | 3/2011 |
| JP | 2014-153410 A | 8/2014 |

* cited by examiner

*Primary Examiner* — Sandra Brase
(74) *Attorney, Agent, or Firm* — LUCAS & MERCANTI, LLP

(57) ABSTRACT

The image forming apparatus is an image forming apparatus for forming an image on a recording material using an electrophotographic process, and includes a transfer section that transfers a toner image on an image bearing member onto a transfer-receiving member; and a hardware processor (transfer voltage controller) that controls a transfer voltage to be applied to the transfer section by correcting a reference transfer voltage with a correction amount that is based on an environmental change, wherein, the correction amount depends on at least the transfer voltage, and the hardware processor determines the correction amount for determining the transfer voltage for a current transfer by referring to the transfer voltage for an immediately preceding transfer.

13 Claims, 6 Drawing Sheets

Number of printed sheet ≤ 100 kp

| | | Transfer voltage V (kV) | | | | | | | | |
|---|---|---|---|---|---|---|---|---|---|---|
| | | 0.1≤V<1.0 | 1.0≤V<1.5 | 1.5≤V<2.0 | 2.0≤V<2.5 | 2.5≤V<3.0 | 3.0≤V<4.0 | 4.0≤V<5.0 | 5.0≤V<6.0 | 6.0≤V<8.0 |
| Internal temperature T (°C) | 5≤T<10 | 20 | -4 | -50 | -111 | -160 | -240 | -280 | -445 | -609 |
| | 10≤T<15 | 20 | -4 | -50 | -111 | -160 | -240 | -280 | -439 | -603 |
| | 15≤T<20 | 30 | 7 | -50 | -99 | -160 | -240 | -280 | -433 | -597 |
| | 20≤T<25 | 30 | 7 | -40 | -99 | -149 | -240 | -251 | -426 | -590 |
| | 25≤T<30 | 40 | 7 | -40 | -75 | -149 | -240 | -251 | -420 | -584 |
| | 30≤T<35 | 50 | 7 | -38 | -75 | -149 | -240 | -251 | -414 | -578 |
| | 35≤T<40 | 50 | 15 | -33 | -75 | -149 | -240 | -251 | -407 | -571 |

41

100 kp ≤ Number of printed sheet < 700 kp

| | | Transfer voltage V (kV) | | | | | | | | |
|---|---|---|---|---|---|---|---|---|---|---|
| | | 0.1≤V<1.0 | 1.0≤V<1.5 | 1.5≤V<2.0 | 2.0≤V<2.5 | 2.5≤V<3.0 | 3.0≤V<4.0 | 4.0≤V<5.0 | 5.0≤V<6.0 | 6.0≤V<8.0 |
| Internal temperature T (°C) | 5≤T<10 | *** | *** | *** | *** | *** | *** | *** | *** | *** |
| | 10≤T<15 | *** | *** | *** | *** | *** | *** | *** | *** | *** |
| | 15≤T<20 | *** | *** | *** | *** | *** | *** | *** | *** | *** |
| | 20≤T<25 | *** | *** | *** | *** | *** | *** | *** | *** | *** |
| | 25≤T<30 | *** | *** | *** | *** | *** | *** | *** | *** | *** |
| | 30≤T<35 | *** | *** | *** | *** | *** | *** | *** | *** | *** |
| | 35≤T<40 | *** | *** | *** | *** | *** | *** | *** | *** | *** |

42

700 kp ≤ Number of printed sheet <1500 kp

| | | Transfer voltage V (kV) | | | | | | | | |
|---|---|---|---|---|---|---|---|---|---|---|
| | | 0.1≤V<1.0 | 1.0≤V<1.5 | 1.5≤V<2.0 | 2.0≤V<2.5 | 2.5≤V<3.0 | 3.0≤V<4.0 | 4.0≤V<5.0 | 5.0≤V<6.0 | 6.0≤V<8.0 |
| Internal temperature T (°C) | 5≤T<10 | 88 | 64 | 18 | -43 | -92 | -172 | -212 | -378 | -542 |
| | 10≤T<15 | 88 | 64 | 18 | -43 | -92 | -172 | -212 | -371 | -535 |
| | 15≤T<20 | 98 | 75 | 18 | -31 | -92 | -172 | -212 | -365 | -529 |
| | 20≤T<25 | 98 | 75 | 28 | -31 | -81 | -172 | -183 | -359 | -523 |
| | 25≤T<30 | 108 | 75 | 28 | -7 | -81 | -172 | -183 | -352 | -516 |
| | 30≤T<35 | 118 | 75 | 30 | -7 | -81 | -172 | -183 | -346 | -510 |
| | 35≤T<40 | 118 | 83 | 35 | -7 | -81 | -172 | -183 | -340 | -504 |

43

C 1500 kp ≤ Number of printed sheet

| | | Transfer voltage V (kV) | | | | | | | | |
|---|---|---|---|---|---|---|---|---|---|---|
| | | 0.1≤V<1.0 | 1.0≤V<1.5 | 1.5≤V<2.0 | 2.0≤V<2.5 | 2.5≤V<3.0 | 3.0≤V<4.0 | 4.0≤V<5.0 | 5.0≤V<6.0 | 6.0≤V<8.0 |
| Internal temperature T (°C) | 5≤T<10 | *** | *** | *** | *** | *** | *** | *** | *** | *** |
| | 10≤T<15 | *** | *** | *** | *** | *** | *** | *** | *** | *** |
| | 15≤T<20 | *** | *** | *** | *** | *** | *** | *** | *** | *** |
| | 20≤T<25 | *** | *** | *** | *** | *** | *** | *** | *** | *** |
| | 25≤T<30 | *** | *** | *** | *** | *** | *** | *** | *** | *** |
| | 30≤T<35 | *** | *** | *** | *** | *** | *** | *** | *** | *** |
| | 35≤T<40 | *** | *** | *** | *** | *** | *** | *** | *** | *** |

44

FIG. 3

IMAGE FORMING APPARATUS, IMAGE FORMING METHOD, AND COMPUTER-READABLE NON-TRANSITORY RECORDING MEDIUM

CROSS REFERENCE TO RELATED APPLICATIONS

The entire disclosure of Japanese Patent Application No. 2022-134964, filed on Aug. 26, 2022 is incorporated herein by reference in its entirety.

BACKGROUND

Technological Field

The present invention relates to an image forming apparatus, an image forming method, and a computer-readable non-transitory recording medium storing a program.

Description of Related Art

In an image forming apparatus (a printer, a copying machine, a facsimile, or the like) using an electrophotographic process technology, a uniformly charged photoreceptor is irradiated (exposed) with laser light based on image data, so that an electrostatic latent image is formed on a surface of the photoreceptor. Then, the electrostatic latent image is visualized as a toner image by supplying toner to the photoreceptor. The toner image is, for example, indirectly transferred onto a recording material via an intermediate transfer member, and then heated and pressed by a fixing device. Through the above steps, an image is formed on the recording material.

In general, in a transfer step of transferring a toner image from a photoreceptor to an intermediate transfer body, the toner image is transferred by applying a transfer voltage under constant voltage control to a transfer section. In order to properly transfer the toner image to the intermediate transfer member, a predetermined current needs to be applied to the transfer section. Therefore, the transfer voltage is controlled based on the resistance of the transfer section (see, for example, Japanese Unexamined Patent Publication No. 2014-153410, Japanese Unexamined Patent Publication No. 2011-053435).

Japanese Unexamined Patent Publication No. 2014-153410 discloses a technique called ATVC (Active Transfer Voltage Control) which can cope with a change in resistance of a transfer section due to an environmental change such as a temperature in the apparatus. The ATVC appropriately detects an energization current in the transfer section and controls the transfer voltage. Japanese Unexamined Patent Publication No. 2011-053435 discloses a technique for controlling a transfer voltage based on the environmental dependency of the resistance value of a transfer member and the environmental change in the apparatus.

ATVC can be executed at the start of a print job or between sheets (between image areas) when images are formed on the flat cut sheets. However, in a case where an image is formed on continuous paper such as continuous form paper or a roll sheet, there is almost no sheet interval, and it is difficult to perform ATVC during execution of a print job. Therefore, in a case where a resistance of the transfer section changes due to an environmental change (e.g., a change in an internal temperature) or the like during execution of a print job, there is a risk that a predetermined current is not applied and a transfer defect of the toner image occurs.

SUMMARY

An object of the present invention is to provide an image forming apparatus, an image forming method, and a non-transitory computer-readable recording medium storing a program each capable of appropriately controlling a transfer voltage in response to an environmental change during execution of a print job and capable of maintaining stable image quality.

In order to achieve at least one of the aforementioned objects, an image forming apparatus according to one aspect of the present invention is an image forming apparatus for forming an image on a recording material by using an electrophotographic process, the image forming apparatus including:

a transfer section that transfers a toner image on an image bearing member onto a transfer-receiving member;

a hardware processor that controls a transfer voltage to be applied to the transfer section by correcting a reference transfer voltage with a correction amount that is based on an environmental change, wherein, the correction amount depends on at least the transfer voltage, and the hardware processor determines the correction amount for determining the transfer voltage for a current transfer by referring to the transfer voltage for an immediately preceding transfer.

An image forming method according to one aspect of the present invention is an image forming method for forming an image on a recording material using an electrophotographic process, the method including:

controlling a transfer voltage to be applied to the transfer section by correcting a reference transfer voltage with a correction amount that is based on an environmental change; and applying the transfer voltage to the transfer section and transferring a toner image that is on an image bearing member onto a transfer-receiving member; wherein, the correction amount depends on at least the transfer voltage, and the controlling the transfer voltage includes determining the correction amount for determining the transfer voltage for a current transfer by referring to the transfer voltage for an immediately preceding transfer.

A computer-readable non-transitory recording medium according to one aspect of the present invention is a computer-readable non-transitory recording medium storing a program for causing a computer of an image forming apparatus that forms an image on a recording material using an electrophotographic process to execute predetermined processing, the predetermined processing including:

processing of controlling a transfer voltage to be applied to the transfer section by correcting a reference transfer voltage with a correction amount that is based on an environmental change; and processing of applying the transfer voltage to the transfer section and transferring a toner image that is on an image bearing member onto a transfer-receiving member; wherein the correction amount depends on at least the transfer voltage, and the processing of controlling the transfer voltage includes determining the correction amount for determining the transfer voltage for a current transfer by referring to the transfer voltage for an immediately preceding transfer.

BRIEF DESCRIPTION OF DRAWINGS

The advantages and features provided by one or more embodiments of the invention will become more fully understood from the detailed description given hereinbelow and the appended drawings which are given by way of illustration only, and thus are not intended as a definition of the limits of the present invention:

FIG. 3 is a diagram illustrating examples of correction coefficient tables for determining a correction coefficient;

DETAILED DESCRIPTION OF EMBODIMENTS

Hereinafter, one or more embodiments of the present invention will be described with reference to the drawings. However, the scope of the invention is not limited to the disclosed embodiments.

Hereinafter, embodiments of the present invention will be described in detail with reference to the drawings.

Figure 1:
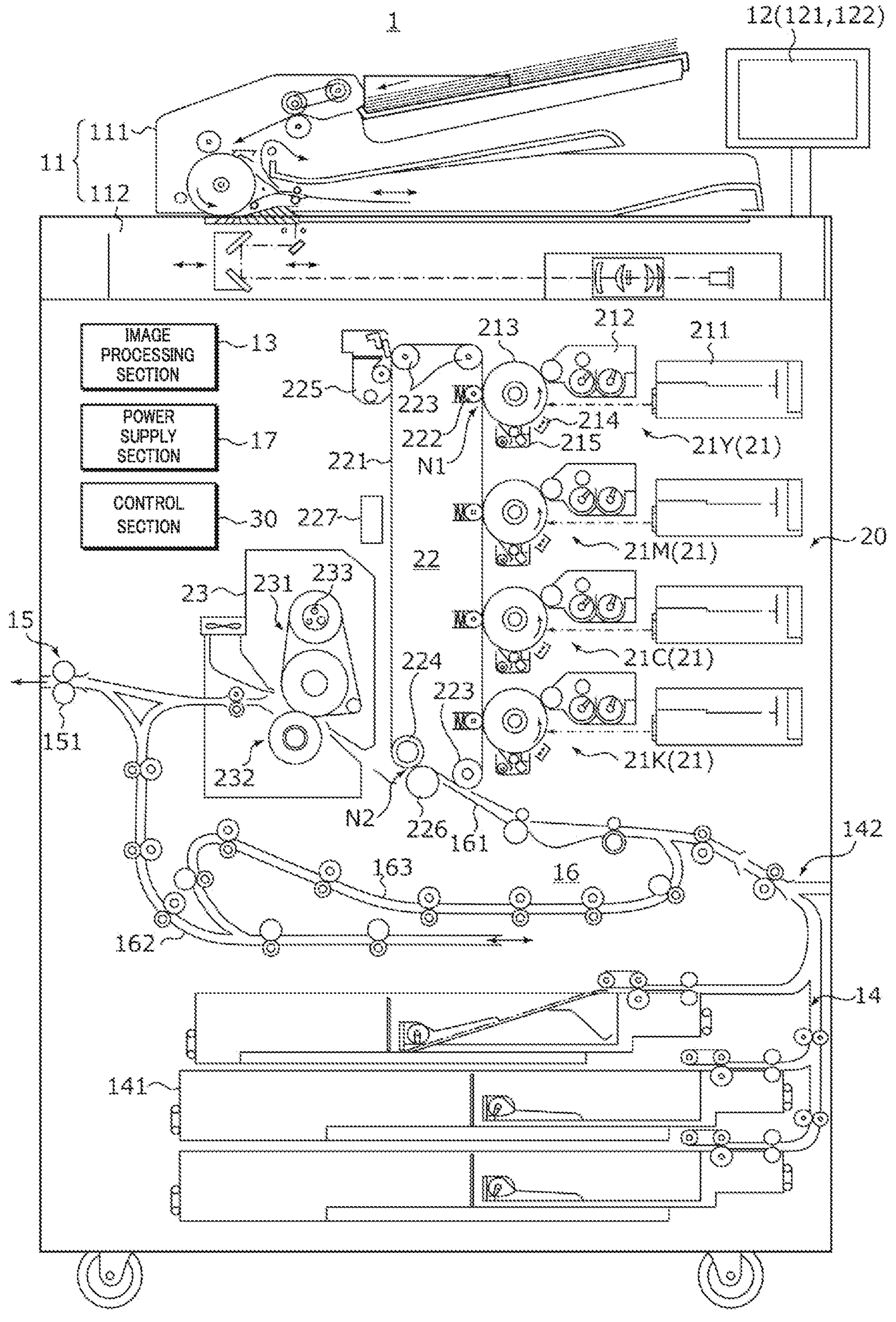
FIG. 1 is a diagram illustrating an overall configuration of an image forming apparatus according to an embodiment of the present invention.
Figure 2:
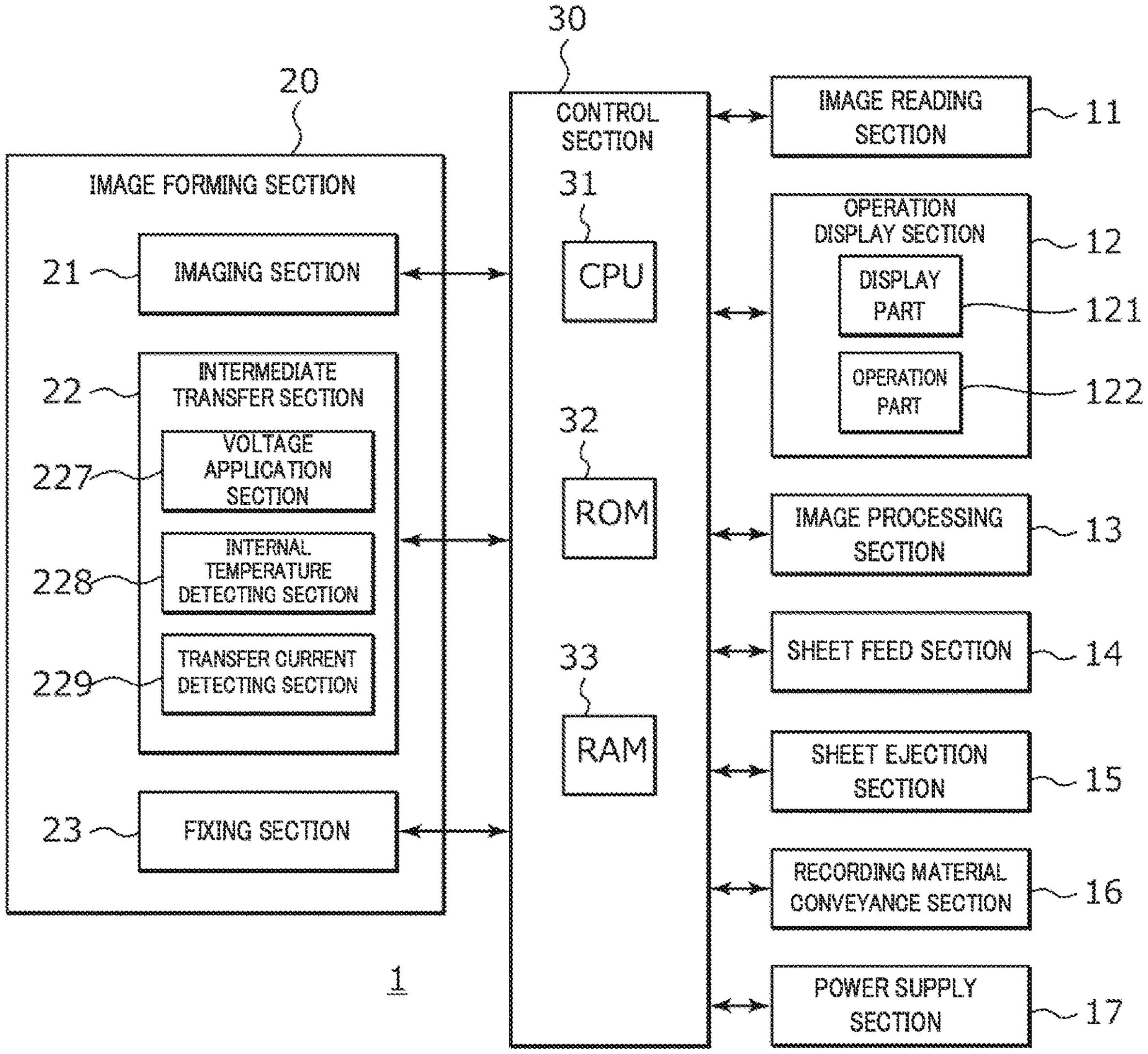
FIG. 2 is a diagram illustrating a main part of a control system of the image forming apparatus according to the present embodiment.

FIG. 1 is a diagram illustrating an overall configuration of an image forming apparatus 1 according to an embodiment. FIG. 2 is a diagram illustrating a main part of a control system of the image forming apparatus 1.

The image forming apparatus 1 illustrated in FIGS. 1 and 2 is a color image forming apparatus with an intermediate transfer method utilizing an electrophotographic process technology. The image forming apparatus 1 forms an image by primarily transferring toner images of respective colors of Y (yellow), M (magenta), C (cyan), and K (black) formed on photoreceptor drums 213 to an intermediate transfer belt 221, superimposing the toner images of four colors on the intermediate transfer belt 221, and then secondarily transferring the toner images to a recording material.

In the present embodiment, the image forming apparatus 1 adopts a vertical tandem system in which the photoreceptor drums 213 corresponding to the four colors of CMYK are arranged in series in the traveling direction (vertical direction) of the intermediate transfer belt 221, and toner images of the respective colors are sequentially transferred to the intermediate transfer belt 221 in one sequence.

As illustrated in FIG. 1, the image forming apparatus 1 includes an image reading section 11, an operation display section 12, an image processing section 13, a sheet feed section 14, a sheet ejection section 15, a recording material conveyance section 16, a power supply section 17, an image forming section 20, a controller 30, and the like.

The controller 30 performs overall control of the image forming apparatus 1 by controlling the image reading section 11, the operation display section 12, the image processing section 13, the sheet feed section 14, the sheet ejection section 15, the recording material conveyance section 16, the power supply section 17, and the image forming section 20 in accordance with their functions.

The controller 30 is a hardware processor including a central processing unit (CPU) 31 as a computation/control device, and a read only memory (ROM) 32 and a random access memory (RAM) 33 as main storage devices. A basic program and basic setting data are stored in the ROM 32. A program for realizing an image formation processing such as a transfer control process is stored in the ROM 32. The CPU 31 reads a program according to processing contents from the ROM 32, develops the program in the RAM 33, and executes the developed program to control an operation of each functional block of the image forming apparatus 1.

In the present embodiment, the hardware constituting the functional blocks and the controller 30 cooperate with each other to realize the functions of the functional blocks. The controller 30 may execute a program to implement part or all of the functions of the functional blocks.

The image reading section 11 includes an automatic document feed device 111 called an auto document feeder (ADF), a document image scanning device 112 (scanner), and the like.

The automatic document feed device 111 conveys a document placed on a document tray by a conveyance mechanism and sends the document to the document image scanning device 112. Using the automatic document feed device 111, it is possible to continuously read images of a large number of documents placed on the document tray (including both faces).

The document image scanning device 112 optically scans a document conveyed from the automatic document feed device 111 onto a contact glass or a document placed on the contact glass. The document image scanning device 112 reads a document image by forming an image of light reflected from a document on a light receiving surface of an imaging element (e.g., charge coupled device (CCD)). The image reading section 11 generates input image data based on a result of reading by the document image scanning device 112. The input image data undergoes predetermined image processing in the image processing section 13.

The operation display section 12 is composed of a flat panel display with a touch screen, for example. As the flat panel display, a liquid crystal display, an organic EL display, or the like can be used. The operation display section 12 includes a display part 121 and an operation part 122.

The display part 121 displays various operation screens, an image state, an operation state of each function, and the like according to a display control signal input from the controller 30.

The operation part 122 includes various operation keys such as a numeric keypad and a start key. The operation part 122 receives various input operations by a user and outputs an operation signal to the controller 30. A user can operate the operation display section 12 to make settings related to image formation, such as document setting, image quality setting, magnification setting, application setting, output setting, and recording material setting.

The image processing section 13 includes, for example, a circuit that applies digital image processing to input image data in accordance with initial settings or user settings. For example, the image processing section 13 applies tone correction on the basis of tone correction data under the control of the controller 30. The image processing section 13 performs various kinds of correction processing such as color correction, shading correction, and density correction on the input image data. The image forming section 20 is controlled on the basis of the processed image data.

The image forming section 20 includes an imaging section 21, an intermediate transfer section 22, and a fixing section 23. The imaging section 21 forms a toner image with each of the color toners of a Y component, an M component, a C component, and a K component, based on the input image data. The intermediate transfer section 22 transfers the toner image formed by the imaging section 21 to a recording material. The fixing section 23 fixes the transferred toner image on the recording material.

For example, the imaging section 21 includes four imaging sections 21Y, 21M, 21C, and 21K for the Y, M, C, and K components, respectively. Since the imaging sections 21Y, 21M, 21C, and 21K have a similar configuration, common constituent elements are denoted by the same reference signs for convenience of illustration and description. When the imaging sections 21Y, 21M, 21C, and 21K are distinguished from each other, Y, M, C, and K are added to the reference signs. Note that in FIG. 1, reference signs are provided only to the constituent elements of the imaging section 21Y for the Y component and the reference signs of the constituent elements of the other imaging sections 21M, 21C, 21K are omitted.

Each imaging section 21 includes an exposure device 211, a developing device 212, a photoreceptor drum 213, a charging device 214, and a drum cleaning device 215. Although not illustrated in the drawings, the imaging section 21 may include a neutralization device for removing residual charges remaining on the surface of the photoreceptor drum 213 after the primary transfer.

The photoreceptor drum 213 is a negatively-chargeable organic photo-conductor (OPC) with an under coat layer (UCL), a charge generation layer (CGL), and a charge transport layer (CTL) sequentially layered on the periphery of a conductive cylindrical body made of aluminum (aluminum tube), for example. The charge generation layer is made of an organic semiconductor in which a charge generating material (e.g., phthalocyanine pigment) is dispersed in a resin binder (e.g., polycarbonate). The charge generation layer receives exposure from the exposure device 211 and generates a pair of positive charge and negative charge. The charge transport layer is formed of a material in which a hole transporting material (electron-donating nitrogen-containing compound) is dispersed in a resin binder (e.g., polycarbonate resin). The charge transport layer transports the positive charges generated in the charge generation layer to a surface of the charge transport layer.

The charging device 214 is, for example, a corona discharge generator such as a scorotron charging device or a corotron charging device. The charging device 214 uniformly negatively charges the outer circumferential surface of the photoreceptor drum 213 by corona discharge.

The exposure device 211 is composed of, for example, an LED print head (LPH). The exposure device 211 includes an LED array, an LPH drive section (driver IC), a lens array, etc. The LED array is composed of a plurality of linearly arranged light emitting diodes (LED). The LPH drive section drives the individual LEDs. The lens array forms an image of the radiated light from the LED array on the photoreceptor drum 213. One LED of the LED array corresponds to one dot of the image.

The exposure device 211 emits light corresponding to images of individual color components toward the photoreceptor drum 213. Upon irradiation with the light, the positive charge generated in the charge generation layer of the photoreceptor drum 213 is transported to the surface of the charge transport layer, whereby the surface charge (negative charge) of the photoreceptor drum 213 is neutralized. Thus, an electrostatic latent image of each color component is formed on the surface of the photoreceptor drum 213 due to a potential difference from the surroundings.

The developing device 212 contains developer of each color component. The developer is, for example, a two component developer containing a toner and a magnetic carrier. The developing device 212 attaches the toner of each color component to the surface of the photoreceptor drum 213 to visualize the electrostatic latent image and form a toner image. Specifically, a developing bias voltage is applied to a developer bearing member (reference sign omitted, for example, a developing roller), and an electric field is formed between the photoreceptor drum 213 and the developer bearing member. Due to the potential difference between the photoreceptor drum 213 and the developer bearing member, the charged toner on the developer bearing member moves to and adheres to the exposure section on the surface of the photoreceptor drum 213. Thus, the electrostatic latent image on the photoreceptor drum 213 is visualized.

The drum cleaning device 215 includes a drum cleaning blade (reference sign is omitted) that slidingly contacts the surface of the photoreceptor drum 213. The drum cleaning device 215 removes transfer residual toner remaining on the surface of the photoreceptor drum 213 after the primary transfer.

The intermediate transfer section 22 includes an intermediate transfer belt 221, primary transfer rollers 222, a plurality of support rollers 223 and 224, a belt cleaning device 225, a secondary transfer roller 226, a voltage application section 227, an internal temperature detecting section 228, a transfer current detecting section 229, and the like.

The intermediate transfer belt 221 is an image bearing member that bears a toner image, and is a transfer-receiving member onto which the toner image on the photoreceptor drum 213 is transferred. The intermediate transfer belt 221 is formed of an endless belt, and is stretched around a plurality of support rollers 223 in a loop shape. At least one of the plurality of support rollers 223 is configured as a driving roller, and the others are configured as driven rollers. As the driving roller rotates, the intermediate transfer belt 221 runs at a constant speed.

The primary transfer rollers 222 are each placed on the inner peripheral surface side of the intermediate transfer belt 221 facing the photoreceptor drum 213 of each color component. The primary transfer roller 222 is pressed against the photoreceptor drum 213 with the intermediate transfer belt 221 interposed therebetween, thereby forming a transfer nip N1 (hereinafter, referred to as a "primary transfer section N1"). At the transfer nip N1, the toner image is transferred from the photoreceptor drum 213 to the intermediate transfer belt 221.

The support roller 223 include a counter roller 224. The counter roller 224 is disposed to face the secondary transfer roller 226. The secondary transfer roller 226 is disposed on the outer peripheral surface side of the intermediate transfer belt 221, and is pressed against the counter roller 224 with the intermediate transfer belt 221 interposed therebetween. Thus, a transfer nip N2 (hereinafter, referred to as a "secondary transfer section N2") is formed. At the transfer nip N2, the toner image is transferred from the intermediate transfer belt 221 to the recording material.

At the primary transfer section N1, the toner images on the photoreceptor drums 213 are sequentially superimposed on the intermediate transfer belt 221 for primary transfer. Specifically, a primary transfer voltage is applied to the primary transfer roller 222 by the voltage application section 227, and an electric charge having a polarity opposite to that of the toner is applied to an inner peripheral surface side (a side on which the primary transfer roller 222 abuts) of the intermediate transfer belt 221. Thus, the toner images are electrostatically transferred from the photoreceptor drum 213 to the intermediate transfer belt 221.

Thereafter, when the recording material passes through the secondary transfer section N2, the toner images on the intermediate transfer belt 221 is secondary-transferred onto the recording material. Specifically, a secondary transfer voltage is applied to the secondary transfer roller 226 by a voltage application section 227, and an electric charge having a polarity opposite to that of the toner is applied to a back surface side (a side on which the secondary transfer roller 226 abuts) of the recording material. Thus, the toner images are electrostatically transferred from the intermediate transfer belt 221 to the recording material. The recording material on which the toner images have been transferred is conveyed toward a fixing section 23.

The internal temperature detecting section 228 is provided near the intermediate transfer belt 221. The internal temperature detecting section 228 detects the internal temperature of the image forming apparatus 1. Specifically, the internal temperature is a temperature near the intermediate transfer belt 221. A signal indicating the internal temperature detected by the internal temperature detecting section 228 is transmitted to the controller 30 and stored in, for example, the ROM 32. In the present embodiment, the internal temperature is detected by the internal temperature detecting section 228, and thus a primary transfer voltage at the primary transfer section N1 is appropriately controlled in accordance with changes in the environment (e.g., changes in the internal temperature) inside the image forming apparatus 1.

The transfer current detecting section 229 detects a current flowing through the primary transfer section N1 when the primary transfer voltage is applied. The controller 30 appropriately determines and controls the primary transfer voltage based on a primary transfer current detected by the transfer current detecting section 229 (so-called ATVC). The ATVC is performed before the start of a print job or between sheets.

The belt cleaning device 225 includes a belt cleaning blade (reference sign is omitted) that slidingly contacts the surface of the intermediate transfer belt 221. The belt cleaning device 225 removes transfer residual toner remaining on the surface of the intermediate transfer belt 221 after the secondary transfer.

The fixing section 23 includes, for example, an upper fixing section 231, a lower fixing section 232, a heating source 233, and a pressure contact/separation section (not illustrated). The upper fixing section 231 includes a fixing surface-side member placed on a fixing surface (surface on which the toner images are formed) side of the recording material. The lower fixing section 232 includes a back surface-side support member placed on a side of a back surface (surface opposite to the fixing surface) of the recording material. The heating source 233 heats the fixing surface-side member. The pressure contact/separation section presses the back surface-side support member against the fixing surface-side member.

The recording material, on which the toner images have been secondarily transferred and which has been conveyed along a sheet passing path, is heated and pressurized when passing through the fixing section 23. Thus, the toner images are fixed onto the recording material.

The sheet feed section 14 includes a sheet feed tray 141 and a manual sheet feed section 142. In the sheet feed tray 141, flat cut sheets (standard sheets and special sheets) identified based on a basis weight, a size, and the like are accommodated for each sheet type set in advance. In the sheet feed tray 141 and the manual sheet feed section 142, a plurality of sheet feed roller sections (reference signs omitted) are arranged. A large-capacity external sheet feed device (not illustrated) can be connected to the manual sheet feed section 142. The external sheet feed device may be capable of feeding continuous paper such as a roll sheet. The sheet feed section 14 sends the recording material fed from the sheet feed tray 141 or the manual sheet feed section 142 to the recording material conveyance section 16.

The sheet ejection section 15 includes a sheet ejection conveyance roller section 151 and the like, and ejects the recording material sent from the recording material conveyance section 16 to the outside of the apparatus.

The recording material conveyance section 16 includes a main conveyance section 161, a switchback conveyance section 162, a back surface printing conveyance section 163, a sheet passing path switching section (not illustrated), and the like. A part of the recording material conveyance section 16 may be incorporated into one unit together with the fixing section 23, for example, and may be detachably attached to the image forming apparatus 1.

The main conveyance section 161 includes a plurality of conveyance roller sections (reference signs are omitted) including a loop roller section and a registration roller section. The conveyance roller sections are recording material conveyance elements that sandwich and convey the recording material. The main conveyance section 161 conveys a recording material fed from the sheet feed section 14 and passes the recording material to the image forming section 20 (the intermediate transfer section 22 and the fixing section 23). The main conveyance section 161 conveys the recording material sent out from the image forming section 20 (fixing section 23) toward the sheet ejection section 15 or the switchback conveyance section 162.

The switchback conveyance section 162 temporarily stops the recording material sent from the fixing section 23, reverses the conveyance direction, and conveys the recording material to the sheet ejection section 15 or the back surface printing conveyance section 163.

The back surface printing conveyance section 163 circulates and conveys the recording material switched back by the switchback conveyance section 162 to the main conveyance section 161. The recording material is passed through the main conveyance section 161 in a state in which the back surface is an image forming surface.

The sheet passing path switching section (not illustrated) is disposed downstream of the fixing section 23 with respect to the recording material conveyance direction. The sheet passing path switching section switches the sheet passing path depending on whether the recording material sent from the fixing section 23 is ejected as it is, is reversed and ejected, or is conveyed to the back surface printing conveyance section 163. Specifically, the controller 30 controls operation of the sheet passing path switching section (not illustrated) based on processing details (single-sided/double-sided printing, face-up/face-down sheet ejection, and the like) of the image formation processing.

The recording material fed from the sheet feed section 14 is conveyed to the image forming section 20 by the main conveyance section 161. Then, when the recording material passes through the secondary transfer section, the toner images on the intermediate transfer belt 221 are collectively transferred onto a first surface (front surface) of the recording material, and fixing processing is performed in the fixing section 23. The recording material on which the image is formed is ejected to the outside of the apparatus by the sheet ejection section 15. In a case where images are formed on both sides of the recording material, the recording material having the image formed on the first surface is sent to a switchback conveyance section 162, and returns to the main conveyance section 161 through the back surface printing conveyance section 163. As a result, the recording material is reversed, and an image is formed on the second surface (back surface).

The power supply section 17 is connected to a commercial AC power source (not illustrated), converts AC source power input from the commercial AC power source into DC source power, and supplies each section with a required voltage.

Hereinafter, control processing of the primary transfer voltage at the primary transfer section N1 will be described.

In the present embodiment, the CPU 31 of the controller 30 functions as a transfer voltage controller. That is, the CPU 31 controls the primary transfer voltage to be applied to the primary transfer section N1 (e.g., the primary transfer roller 222) in the primary transfer process. Furthermore, ROM 32 stores the primary transfer voltage applied to the primary transfer section N1, the internal temperature of the apparatus detected by the internal temperature detecting section 228, and a use history of the primary transfer roller 222 that is a transfer member of the primary transfer section N1.

A first storage section that stores the primary transfer voltage and a second storage section that stores the internal temperature are frequently read and written in transfer voltage control processing. Therefore, it is preferable that the first storage section and the second storage section are configured by separate hardware. Thus, the speed of the transfer voltage control processing can be increased.

The controller 30 controls the primary transfer voltage to be applied so that a predetermined current is applied to the primary transfer section N1. Thus, the toner image can be properly transferred from the photoreceptor drum 213 to the intermediate transfer belt 221. Concretely, before starting a print job and in the sheet interval, the controller 30 appropriately detects the applied current in the primary transfer section N1 by means of the transfer current detecting section 229 and controls the primary transfer voltage by ATVC. Thus, it is possible to cope with a change in resistance of the primary transfer section N1 (e.g., the primary transfer roller 222) due to an environmental change such as an internal temperature change.

Furthermore, the controller 30 corrects reference transfer voltage V R with a correction amount based on an environmental change, and controls the primary transfer voltage. Specifically, the controller 30 corrects the primary transfer voltage by using a predetermined calculation expression, and performs speculative control of the primary transfer voltage. This is particularly useful in a case where the primary transfer voltage cannot be controlled by ATVC, such as a case of performing printing on continuous paper.

In a case of calculating the primary transfer voltage $V_n$ to be applied at the time of transfer to the n-th sheet (n is a natural number of 2 or more), the controller 30 determines the primary transfer voltage in accordance with the following expression (1), for example.

[1]

$$V_n = V_R + c \times \Delta T \qquad \text{Expression (1)}$$

$V_R$: Reference transfer voltage c: Correction coefficient

ΔT: Internal temperature change amount

That is, the controller 30 corrects the reference transfer voltage V R using a correction amount calculated based on the correction coefficient c and the internal temperature change amount ΔT representing an environmental change.

In Expression (1), for example; the primary transfer voltage $V_{N-1}$ applied at the time of transfer to the (n−1)-th sheet can be applied to the reference transfer voltage $V_R$. A change in temperature from the previous internal temperature $T_{n-1}$ at the time of transfer to the (n−1)-th sheet ($T_n - T_{n-1}$) can be applied to the internal temperature change amount ΔT. That is, in the case of calculating the primary transfer voltage V n to be applied at the time of transfer to the n-th sheet, the controller 30 determines the primary transfer voltage, for example, in accordance with the following expression (2).

[2]

$$V_n = V_{n-1} + c \times (T_n - T_{n-1}) \qquad \text{Expression (2).}$$

Here, the correction coefficient c is set in correspondence with at least the primary transfer voltage. Preferably, the correction coefficient c is set in correspondence with the primary transfer voltage, the internal temperature, and the use history of the primary transfer roller 222. The use history of the primary transfer roller 222 is a time during which the primary transfer roller 222 is used for the primary transfer, that is, a time during which the primary transfer voltage is applied and the primary transfer is performed, and can also be represented by the number of printed sheets.

FIG. 3 is a diagram illustrating an example of the correction coefficient table for determining the correction coefficient c. In the example illustrated in FIG. 3, four correction coefficient tables 41 to 44 are provided corresponding to the number of printed sheets indicating the use history of the primary transfer roller 222. The correction coefficient tables 41 to 44 are stored in, for example, the ROM 32.

The correction coefficient table 41 is referred to when the number of printed sheets is less than 100 kp. The correction coefficient table 42 is referred to when the number of printed sheets is equal to or more than 100 kp and less than 700 kp. The correction coefficient table 43 is referred to when the number of printed sheets is equal to or more than 700 kp and less than 1500 kp. The correction coefficient table 44 is referred to when the number of printed sheets is equal to or more than 1500 kp. In each of the correction coefficient tables 41 to 44, the correction coefficients c are set in correspondence with the primary transfer voltage and the internal temperature.

The correction coefficients c set in the correction coefficient tables 41 to 44 are experimentally obtained in advance so that, for example, the primary transfer voltage $V_n$ calculated from Expression (2) is equivalent to the optimum primary transfer voltage determined by ATVC.

The internal temperature can be divided into, for example, a low-temperature environment, a normal-temperature environment, and a high-temperature environment. The low-temperature environment is, for example, an internal temperature of less than 16° C. The normal-temperature environment is, for example, an internal temperature of 16° C. or more and less than 25° C. The high-temperature environment is, for example, an internal temperature of 25° C. or more. In the case where the primary transfer voltage $V_n$ at the time of transfer to the n-th sheet is calculated by Expression (2), when the correction coefficient c is set for each section of the internal temperature, the corrected primary transfer voltage $V_n$ may deviate from the optimum primary transfer voltage determined by the ATVC depending on the resistance of the primary transfer roller 222.

On the other hand, in the case where the correction coefficient c is set in correspondence with at least the primary transfer voltage (FIG. 3), the correction accuracy of the primary transfer voltage $V_n$ is enhanced irrespective of the magnitude of the resistance of the primary transfer roller 222, so that the proper transfer voltage control equivalent to the ATVC can be effected.

In Expression (2), it can be said that the $c\times(T_n-T_{n-1})$ representing the correction amount depends on at least the primary transfer voltage $V_{n-1}$ at the time of transfer to the (n−1)-th sheet. In the present exemplary embodiment, the $c\times(T_n-T_{n-1})$ representing the correction amount depends on the primary transfer voltage $V_{n-1}$ at the time of transfer to the (n−1)-th sheet, the internal temperature $T_n$ at the time of transfer to the n-th sheet, and the use history of the primary transfer roller 222 at the time of transfer to the n-th sheet.

Figure 4:
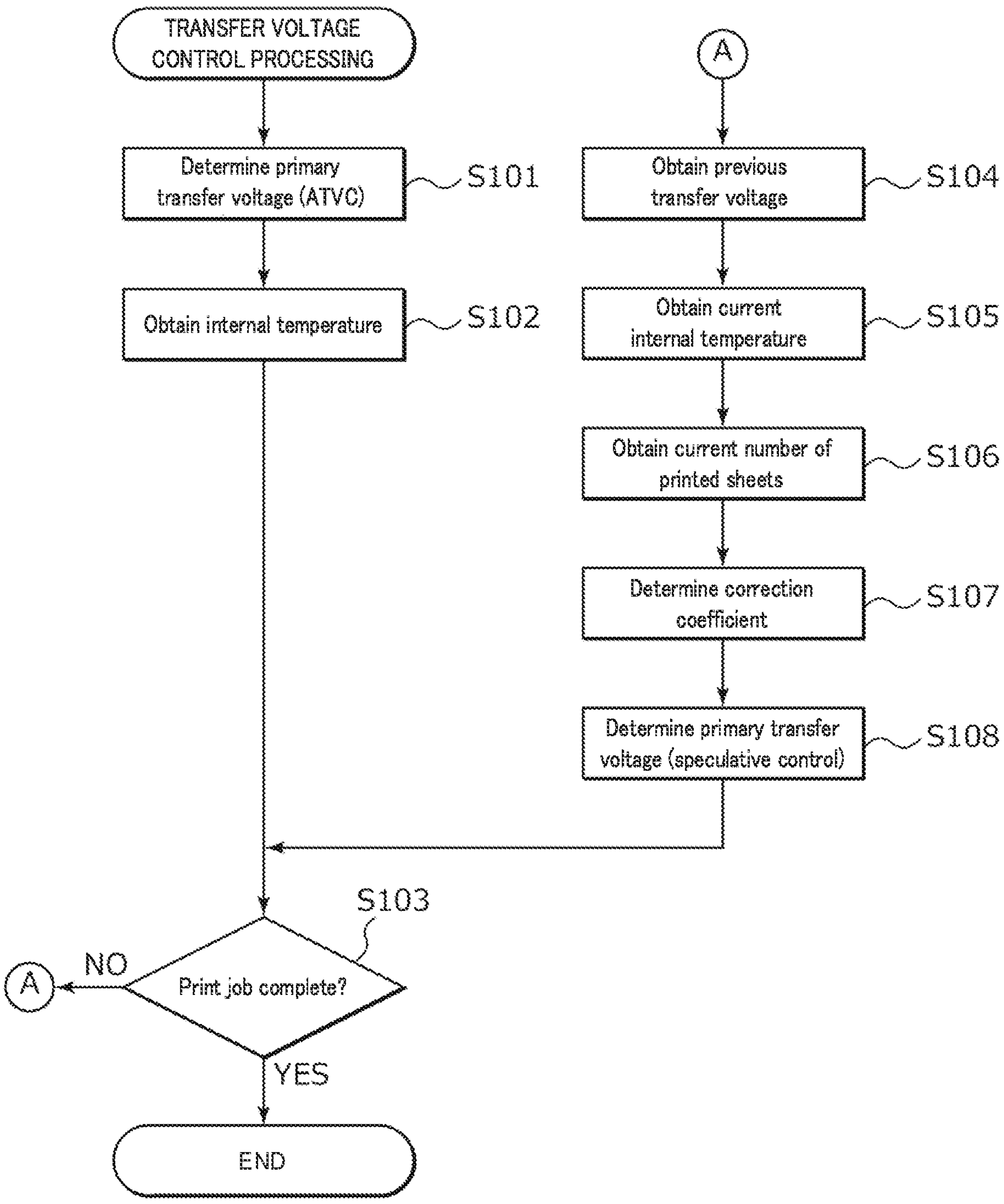
FIG. 4 is a flowchart illustrating an example of a transfer voltage control processing for controlling a primary transfer voltage.
Figure 5:
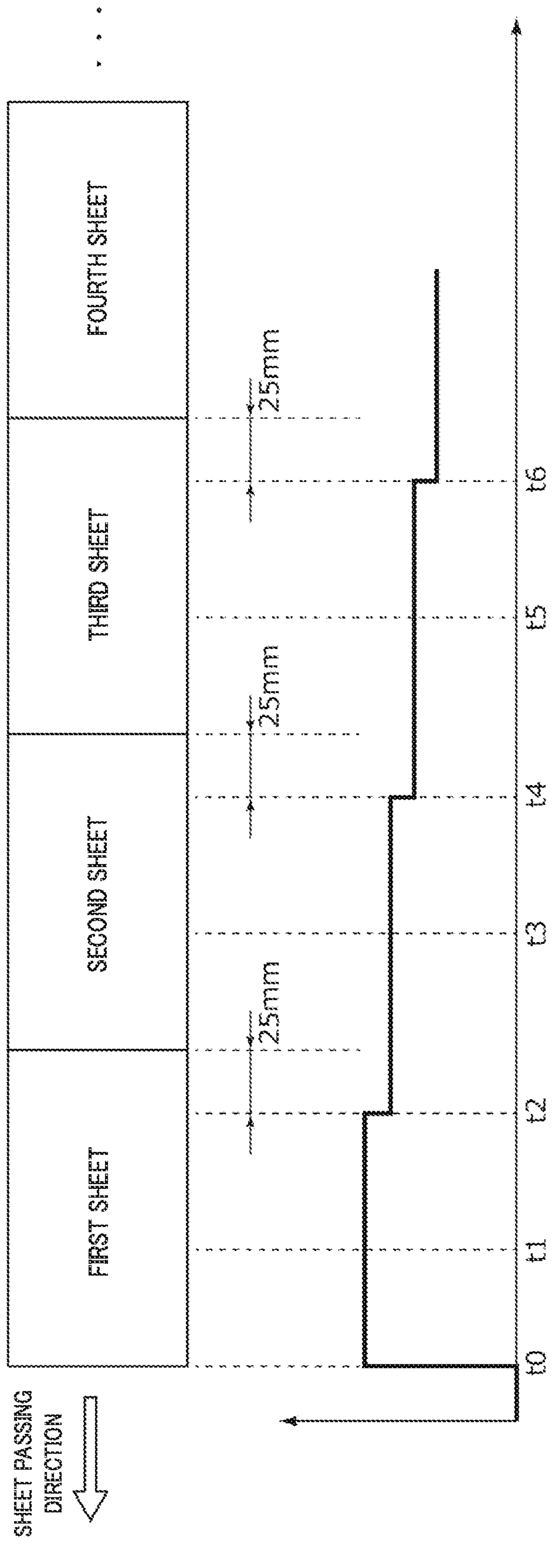
FIG. 5 is a diagram illustrating the timings of the transfer voltage control processing.

FIG. 4 is a flowchart illustrating an example of the transfer voltage control processing for controlling the primary transfer voltage. FIG. 5 is a diagram illustrating timings of the transfer voltage control processing. This processing is implemented, for example, when the CPU 31 executes a predetermined program stored in the ROM 32 in response to input of a print job to the image forming apparatus 1.

Note that the print job is to instruct printing of a plurality of sheets. Further, the use history (for example, the number of printed sheets) of the primary transfer roller 222 is stored in the ROM 32, and is appropriately updated with the execution of the print job.

In step S101 of FIG. 4, the controller 30 determines the primary transfer voltage V1 at the time of transfer to the first sheet before the start of the print job. This process is performed by known ATVC. Further, the controller 30 stores the determined primary transfer voltage V1 in, for example, the ROM 32. In the first transfer process for the first sheet, the primary transfer voltage V1 determined in step S101 is applied to the of the primary transfer section N1 (the primary transfer roller 222).

In step S102, the controller 30 obtains the current internal temperature, that is, the internal temperature T1 at the time of transfer to the first sheet from the internal temperature detecting section 228. Further, the controller 30 stores the obtained internal temperature T1 in, for example, the ROM 32.

In step S103, the controller 30 determines whether or not all printing instructed by the print job has been completed. When all printing has been completed ("YES" in step S103), the controller 30 ends the transfer voltage control processing. When all printing is not completed ("NO" in step S103), the controller 30 proceeds the processing to step S104, and performs the transfer voltage control processing for the primary transfer process for the second and subsequent sheets.

In step S104, the controller 30 reads out the previous primary transfer voltage, that is, the primary transfer voltage $V_{n-1}$ at the time of transfer to the (n−1)-th sheet (V1 in the case of transfer to the second sheet) from, for example, the ROM 32.

In step S105, the controller 30 obtains the current internal temperature, that is, the internal temperature $T_n$ at the time of the transfer to the n-th sheet ($T_2$ in the case of the transfer to the second sheet) from the internal temperature detecting section 228. In addition, the controller 30 stores the obtained internal temperature $T_n$ in, for example, the ROM 32.

In step S106, the controller 30 reads out the current use history of the primary transfer roller 222, that is, the use history at the time of transfer to the n-th sheet, for example, from the ROM 32.

In step S107, the controller 30 determines the correction coefficient c based on the previous primary transfer voltage $V_{n-1}$, the current internal temperature $T_n$, and the current use history of the primary transfer roller 222 obtained in steps S104 to S106.

According to the correction coefficient table illustrated in FIG. 3, for example, when the number of printed sheets is equal to or greater than 700 kp and less than 1500 kp (for example, corresponding to 65 hours of print time), the previous primary transfer voltage $V_{n-1}$ is 1.7 kV, and the current internal temperature $T_n$ is 23° C., the correction coefficient table 43 is referred to, and the correction coefficient c is determined to be "28".

In step S108, the controller 30 calculates the current primary transfer voltage $V_n$ using Expression (2). The controller 30 also stores the calculated primary transfer voltage $V_n$ in, for example, the ROM 32. The primary transfer voltage $V_n$ stored in the ROM 32 is used as the reference transfer voltage when calculating the primary transfer voltage for the next transfer. In the primary transfer process for the second and subsequent sheets, the primary transfer voltage $V_n$ calculated in step S108 is applied to the primary transfer roller 222.

The processes of the steps S104 to S108 are repeated until all printing instructed by the print job is completed in step S103.

Note that the processes of steps S104 to S108 are performed before the primary transfer to the n-th sheet is started, that is, during the primary transfer to the (n−1)-th sheet (e.g., timings t1, t3, and t5 in FIG. 5), and the switching of the primary transfer voltage is performed immediately before the primary transfer to the n-th sheet is started (e.g., timings t2, t4, and t6 in FIG. 5).

Further, although the primary transfer voltage $V_n$ for the n-th sheet is corrected every time a print job is executed for one sheet in FIG. 4, the primary transfer voltage $V_n$ may be corrected at an interval of a predetermined number of sheets.

Figure 6:
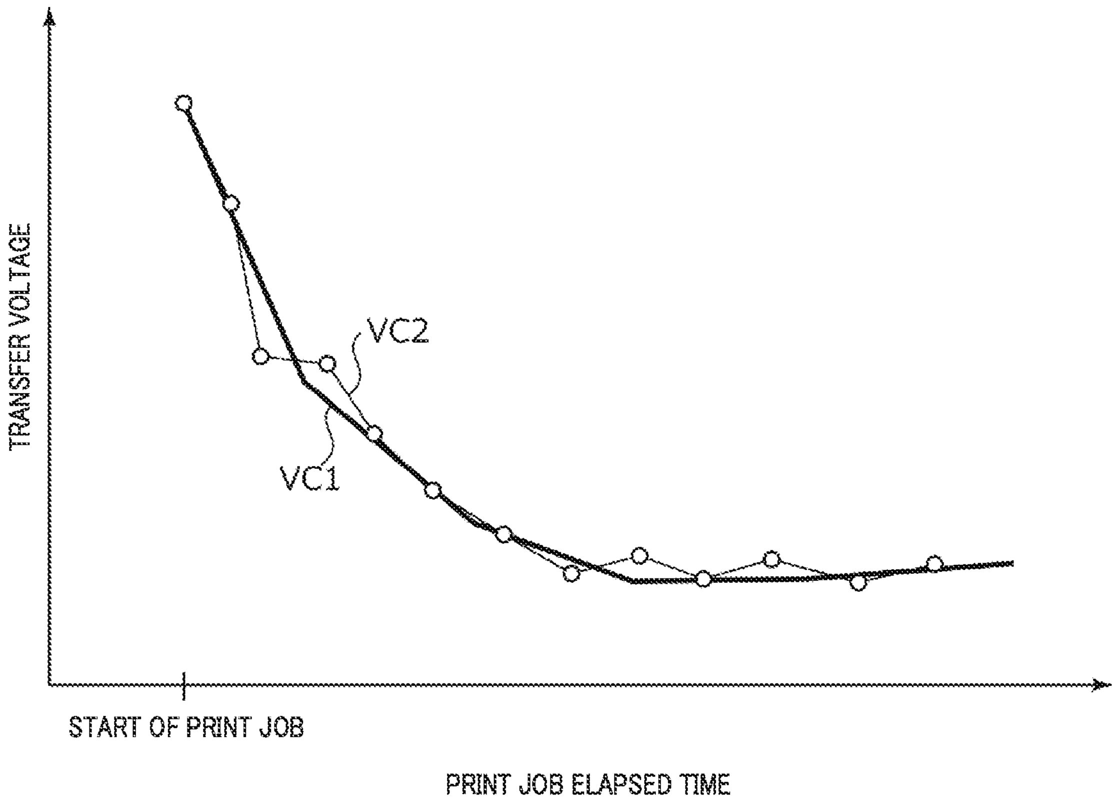
FIG. 6 is a diagram illustrating a change in primary transfer voltage with the lapse of a print job.

FIG. 6 is a diagram illustrating a change in the primary transfer voltage with the lapse of a print job. In FIG. 6, a thick line VC1 indicates the primary transfer voltage by the speculative control according to the present embodiment, and a thin line VC2 indicates the primary transfer voltage by ATVC.

As illustrated in FIG. 5, by the transfer voltage control (speculative control of steps S104 to S108) according to the present embodiment, the primary transfer voltage can be appropriately corrected, and appropriate transfer voltage control equivalent to the ATVC can be performed. Therefore, even in a case where image formation is performed on continuous paper, it is possible to optimize the primary transfer voltage according to a temperature change in the apparatus and to suppress a color difference fluctuation in the same print job, and thus color tone stability is significantly improved. Actually, the inventors of the present invention have executed a print job with a printing distance of 463 m, and have confirmed that the color difference fluctuation is suppressed to ⅓ as compared with the case of setting the correction coefficient c for each category of the internal temperature.

As described above, the image forming apparatus 1 according to the exemplary embodiment has the following features alone or in appropriate combination.

That is, the image forming apparatus 1 is an image forming apparatus that forms an image on a recording material by using an electrophotographic process, and includes: the primary transfer section N1 (transfer section) that transfers a toner image on the photoreceptor drum 213 (image bearing member) onto the intermediate transfer belt 221 (transfer-receiving member); and the controller 30 (hardware processor, transfer voltage controller) that controls the primary transfer voltage $V_n$ to be applied to the primary transfer section N1 by correcting the reference transfer voltage $V_R$ with a correction amount based on the environmental change. The correction amount depends on at least the primary transfer voltage. The controller 30 (hardware processor, transfer voltage controller) determines the correction amount for determining the primary transfer voltage $V_n$ for the current transfer by referring to the primary transfer voltage $V_{n-1}$ for the previous transfer.

The image forming method according to the present embodiment is an image forming method for forming an image on a recording material by using an electrophotographic process, and includes: a first step (steps S104 to S108 in FIG. 4) of controlling the primary transfer voltage $V_n$ to be applied to the primary transfer section N1 (transfer section) by correcting the reference transfer voltage $V_R$ with a correction amount based on the environmental change; and a second step of applying the primary transfer voltage $V_n$ to the primary transfer section N1 and transferring a toner image on the photoreceptor drum 213 (image bearing member) onto the intermediate transfer belt 221 (transfer-receiving member). The correction amount depends on at least the primary transfer voltage. In the first step, the correction amount for determining the primary transfer voltage $V_n$ for the current transfer is determined by referring to the primary transfer voltage $V_{n-1}$ for the previous transfer.

In the embodiment, the image forming apparatus according to the present disclosure is realized by the controller 30 executing a program. That is, the program for the primary transfer process is a program that causes the controller 30 (computer) of the image forming apparatus 1 forming an image on a recording material using an electrophotographic process to execute predetermined processing, and the predetermined process includes: first processing of controlling the primary transfer voltage $V_n$ to be applied to the primary transfer section N1 (transfer section) by correcting the reference transfer voltage $V_R$ with a correction amount based on the environmental change; and second processing of applying the primary transfer voltage $V_n$ to the primary transfer section N1 and transferring a toner image on the photoreceptor drum 213 (image bearing member) onto the intermediate transfer belt 221 (transfer-receiving member). The correction amount depends on at least the primary transfer voltage. In the first processing, the correction amount for determining the primary transfer voltage $V_n$ for the current transfer is determined by referring to the primary transfer voltage $V_{n-1}$ for the previous transfer.

The above program is provided via a non-transitory computer-readable storage medium storing the program. This program is provided via, for example, a computer-readable portable storage medium (including, for example, an optical disk, a magneto-optical disk, and a memory card) storing the program. In addition, for example, the program may be provided by being downloaded from a server having the program via a network.

According to the image forming apparatus 1, it is possible to appropriately control the primary transfer voltage in response to the change in the environmental factor such as the internal temperature during execution of a print job, and to maintain stable image quality. This is particularly useful in the case of performing image formation on continuous paper which has almost no sheet interval and for which ATVC is not possible.

Further, in the image forming apparatus 1, the correction amount depends on the primary transfer voltage, the internal temperature, and the use history of the primary transfer roller 222. The controller 30 (transfer voltage controller) determines the correction amount for determining the primary transfer voltage $V_n$ for the current transfer by referring to the primary transfer voltage $V_{n-1}$ for the previous transfer, the current internal temperature $T_n$, and the current use history of the primary transfer roller 222. Accordingly, the correction amount can be subdivided and set, and the correction accuracy of the primary transfer voltage $V_n$ can be increased.

In the image forming apparatus 1, the correction amount is calculated by using the correction coefficient c associated with at least the transfer voltage. This can reduce the processing load when correcting the primary transfer voltage $V_n$.

Further, in the image forming apparatus 1, the correction amount is calculated based on the correction coefficient c and the internal temperature change amount ΔT indicating the environmental change. As a result, the change in the internal temperature is reflected in the correction amount for correcting the primary transfer voltage $V_n$, so that it is possible to cope with the resistance change of the primary transfer section N1 (primary transfer roller 222) according to the internal temperature change.

In addition, in the image forming apparatus 1, when the primary transfer voltage at the time of transfer to the n-th sheet (n is an integer of 2 or more) is represented by $V_n$, the reference transfer voltage is represented by $V_R$, the correction coefficient is represented by c, and the internal temperature change amount is represented by ΔT, the expression $V_n=V_R\ c\times\Delta T$ is obtained. Thus, the primary transfer voltage $V_n$ can be corrected easily with a further reduction in the processing load.

In the image forming apparatus 1, the reference transfer voltage $V_R$ is the primary transfer voltage at the time of the previous transfer, and the internal temperature change amount ΔT is the amount of change from the internal temperature at the time of the previous transfer. Thus, the primary transfer voltage $V_n$ can be appropriately corrected with the primary transfer voltage at the time of the previous transfer as a reference.

In the image forming apparatus 1, the reference transfer voltage $V_R$ is the primary transfer voltage $V_{n-1}$ at the time of transfer to the (n−1)-th sheet, and the internal temperature change amount ΔT is a difference between the internal temperature $T_{n-1}$ at the time of transfer to the (n−1)-th sheet and the internal temperature $T_n$ at the time of transfer of the n-th sheet. Thus, the primary transfer voltage $V_n$ can be appropriately corrected on a sheet-by-sheet basis with the primary transfer voltage for the previous transfer as a reference.

In the image forming apparatus 1, the recording material is continuous paper. In a case where continuous paper is applied as the recording material, there are almost no sheet intervals and it is difficult to perform ATVC, but the present disclosure can also cope with such a case.

In the image forming apparatus 1, the recording material is a flat cut sheet. In the case where a flat cut sheet is used as the recording material, basically, the primary transfer voltage is preferably controlled by ATVC. However, when image formation is performed at a high speed, there are almost no sheet intervals, and it may be difficult to perform ATVC. The present disclosure can also cope with such a case.

Further, in the image forming apparatus 1, the first storage section that stores the primary transfer voltage and the second storage section that stores the internal temperature are configured as separate hardware. Thus, the speed of the transfer voltage control processing can be increased.

Although the invention made by the present inventors has been specifically described based on the embodiment, the present invention is not limited to the above-described embodiment, and can be modified without departing from the gist thereof.

For example, in the embodiment, the correction coefficient c is set in the correction coefficient tables in association with three parameters including the primary transfer voltage, the internal temperature, and the use history of the primary transfer roller 222, but the correction coefficient c may be determined using a calculation expression having the primary transfer voltage, the internal temperature, and the use history of the primary transfer roller 222 as variables.

For example, the correction amount only needs to depend on at least the primary transfer voltage, and may depend on two parameters including the primary transfer voltage and the internal temperature, or may depend on two parameters including the primary transfer voltage and the use history of the primary transfer roller 222.

Further, in the embodiment, the case where the correction amount based on the internal temperature change is added to the reference transfer voltage $V_R$ has been described, but the correction amount may be set in consideration of the internal humidity change in addition to or instead of the internal temperature change. Alternatively, the initial primary transfer voltage V1 determined by ATVC may be applied as the reference transfer voltage $V_R$.

In the embodiment, the case where the present disclosure is applied to the transfer voltage control of the primary transfer section N1 has been described, but the present disclosure can also be applied to the transfer voltage control of the secondary transfer section N2. Further, the present disclosure can be applied to transfer voltage control in a color or monochrome image forming apparatus of a direct transfer type.

Although embodiments of the present invention have been described and illustrated in detail, the disclosed embodiments are made for purpose of illustration and example only and not limitation. The scope of the present invention should be interpreted by terms of the appended claims.

What is claimed is:

1. An image forming apparatus for forming an image on a recording material by using an electrophotographic process, the image forming apparatus comprising:

a transfer section that transfers a toner image on an image bearing member onto a transfer-receiving member; and a hardware processor that controls a transfer voltage to be applied to the transfer section by correcting a reference transfer voltage with a correction amount that is based on an environmental change, wherein, the correction amount depends on at least the transfer voltage, and the hardware processor determines the correction amount for determining the transfer voltage for a current transfer by referring to the transfer voltage for an immediately preceding transfer.

2. The image forming apparatus according to claim 1, wherein, the correction amount depends on the transfer voltage and an internal temperature, and the hardware processor determines the correction amount for determining the transfer voltage for the current transfer by referring to the transfer voltage for the immediately preceding transfer and the internal temperature at present.

3. The image forming apparatus according to claim 2, wherein, the correction amount depends on the transfer voltage, the internal temperature, and a use history of the transfer section, and the hardware processor determines the correction amount for determining the transfer voltage for the current transfer by referring to the transfer voltage for the immediately preceding transfer, the internal temperature at present, and the use history at present.

4. The image forming apparatus according to claim 2, wherein the transfer voltage is stored in a first storage section, and the internal temperature is stored in a second storage section, the first storage section and the second storage section being configured as separate hardware.

5. The image forming apparatus according to claim 1, wherein the correction amount is calculated by using a correction coefficient associated with at least the transfer voltage.

6. The image forming apparatus according to claim 5, wherein the correction amount is calculated based on the correction coefficient and an internal temperature change amount indicating the environmental change.

7. The image forming apparatus according to claim 6, wherein, $$V_n = V_R + c \times \Delta T,$$

where $V_n$ is the transfer voltage for a transfer to an n-th sheet (n is an integer of 2 or more), $V_R$ is the reference transfer voltage, c is the correction coefficient, and ΔT is the internal temperature change amount.

8. The image forming apparatus according to claim 7, wherein, the reference transfer voltage $V_R$ is the transfer voltage for an immediately preceding transfer, and the internal temperature change amount ΔT is an amount of change from the internal temperature at the immediately preceding transfer.

9. The image forming apparatus according to claim 8, wherein, the reference transfer voltage $V_R$ is the transfer voltage $V_{n-1}$ for a transfer to an (n−1)-th sheet, and the internal temperature change amount ΔT is a difference between the internal temperature $T_{n-1}$ at the transfer to the (n−1)-th sheet and the internal temperature $T_n$ at a transfer to an n-th sheet.

10. The image forming apparatus according to claim 1, wherein the recording material is continuous paper.

11. The image forming apparatus according to claim 1, wherein the recording material is a flat cut sheet.

12. An image forming method for forming an image on a recording material using an electrophotographic process, the method comprising:

controlling a transfer voltage to be applied to the transfer section by correcting a reference transfer voltage with a correction amount that is based on an environmental change; and applying the transfer voltage to the transfer section and transferring a toner image that is on an image bearing member onto a transfer-receiving member, wherein, the correction amount depends on at least the transfer voltage, and the controlling the transfer voltage includes determining the correction amount for determining the transfer voltage for a current transfer by referring to the transfer voltage for an immediately preceding transfer.

13. A computer-readable non-transitory recording medium storing a program for causing a computer of an image forming apparatus that forms an image on a recording material using an electrophotographic process to execute predetermined processing, the predetermined processing comprising:

processing of controlling a transfer voltage to be applied to the transfer section by correcting a reference transfer voltage with a correction amount that is based on an environmental change; and processing of applying the transfer voltage to the transfer section and transferring a toner image that is on an image bearing member onto a transfer-receiving member, wherein, the correction amount depends on at least the transfer voltage, and the processing of controlling the transfer voltage includes determining the correction amount for determining the transfer voltage for a current transfer by referring to the transfer voltage for an immediately preceding transfer.

* * * * *